US012315327B2

(12) United States Patent
Whelan

(10) Patent No.: US 12,315,327 B2
(45) Date of Patent: May 27, 2025

(54) ELECTRONIC GAMING DEVICE WITH FLEXIBLE DISPLAY SCREEN

(71) Applicant: Incredible Technologies, Inc., Vernon Hills, IL (US)

(72) Inventor: Daniel John Whelan, Schaumburg, IL (US)

(73) Assignee: Incredible Technologies, Inc., Vernon Hills, IL (US)

( * ) Notice: Subject to any disclaimer, the term of this patent is extended or adjusted under 35 U.S.C. 154(b) by 486 days.

(21) Appl. No.: 17/577,947

(22) Filed: Jan. 18, 2022

(65) Prior Publication Data

US 2022/0139159 A1 May 5, 2022

Related U.S. Application Data

(63) Continuation-in-part of application No. 16/782,224, filed on Feb. 5, 2020, now Pat. No. 11,475,730, which is a continuation of application No. 15/937,570, filed on Mar. 27, 2018, now Pat. No. 10,580,252.

(60) Provisional application No. 62/477,124, filed on Mar. 27, 2017.

(51) Int. Cl.
*G07F 17/32* (2006.01)

(52) U.S. Cl.
CPC ...... *G07F 17/3213* (2013.01); *G07F 17/3216* (2013.01); *G07F 17/3227* (2013.01)

(58) Field of Classification Search
CPC ............. G07F 17/3216; G07F 17/3213; G07F 17/3227
See application file for complete search history.

(56) References Cited

U.S. PATENT DOCUMENTS

| | | | | |
|---|---|---|---|---|
| 10,440,838 | B2 * | 10/2019 | Heo | H05K 5/0017 |
| 2008/0113715 | A1 | 5/2008 | Beadell et al. | |
| 2010/0120530 | A1 * | 5/2010 | Lesley | G07F 17/3216 463/30 |
| 2013/0114193 | A1 | 5/2013 | Joo | |
| 2013/0194162 | A1 | 8/2013 | Autenzeller | |
| 2014/0018150 | A1 * | 1/2014 | Wells | G07F 17/3216 463/31 |
| 2014/0098075 | A1 | 4/2014 | Kwak et al. | |
| 2014/0357364 | A1 * | 12/2014 | Chudek | G07F 17/3211 463/31 |
| 2016/0055703 | A1 * | 2/2016 | Woels | G07F 17/3213 463/20 |
| 2016/0121213 | A1 | 5/2016 | Choi | |
| 2016/0154435 | A1 * | 6/2016 | Yanagisawa | H04N 13/383 348/47 |
| 2016/0270208 | A1 * | 9/2016 | Bostick | G09F 9/301 |
| 2016/0295711 | A1 | 10/2016 | Ryu | |

(Continued)

*Primary Examiner* — Robert E Mosser
(74) *Attorney, Agent, or Firm* — Levenfeld Pearlstein, LLC

(57) ABSTRACT

An electronic gaming device which comprises a control unit a plurality of electronic display devices and a mechanical device. The plurality of electronic display devices comprising a flexible control panel display coupled to the control unit. The flexible control panel display being configured to display selectable indicia and receive and register touch input. The mechanical device being coupled to the control unit and configured to engage at least a portion of the flexible control panel display. Upon engagement by the mechanical device, the flexible control panel being manipulated from a flat condition to a curved condition.

9 Claims, 13 Drawing Sheets

(56) References Cited

U.S. PATENT DOCUMENTS

| | | | | |
|---|---|---|---|---|
| 2016/0300435 | A1* | 10/2016 | Lind | G07F 17/3239 |
| 2016/0335835 | A1* | 11/2016 | Castro | G07F 17/3204 |
| 2016/0337492 | A1* | 11/2016 | Tseng | H04M 1/0264 |
| 2016/0353594 | A1* | 12/2016 | Cho | F16M 11/08 |
| 2017/0041568 | A1 | 2/2017 | Rakshit | |

* cited by examiner

ELECTRONIC GAMING DEVICE WITH FLEXIBLE DISPLAY SCREEN

CROSS-REFERENCE TO RELATED APPLICATION

This application is a continuation-in-part of U.S. patent application Ser. No. 16/782,224 filed on Feb. 5, 2020 which is a continuation of U.S. patent application Ser. No. 15/937,570 filed Mar. 27, 2018 which issued on Mar. 3, 2020 as U.S. Pat. No. 10,580,252 which claims priority to and the benefit of U.S. Provisional Patent Application Ser. No. 62/477,124 filed Mar. 27, 2017. The entirety of these applications is hereby incorporated by reference as if fully set forth herein.

FIELD

Embodiments of the subject invention are generally directed to a gaming machine, device and method, and more particularly to an electronic gaming device having a flexible display screen that can flex, bend and change shape to enhance the visual presentation of a game played thereon.

BACKGROUND

Electronic gaming machines ("EGMs") are generally well known, with certain games and/or machines enjoying tremendous and widespread popularity for a number of years. In settings where players are allowed to place wagers on the outcome of such games, and such wagers generate revenue for the establishment or operator, it is generally desirable for EGMs to be in continuous use and frequently played. It is also generally understood that players can be drawn to games and/or machines that have unique or innovative features, themes and/or operations which players find interesting and entertaining. By contrast, games that do not provide entertaining or innovative features may not generate or maintain player interest, which may result in such games being played less frequently or subject to extended periods of inactivity. Hence, there are on-going needs to try to bring new technologies or variations to the audience of players in order to generate and/or sustain player interest and desire to continue playing, with such heightened interest typically resulting in greater revenues and profitability.

Typically, EGMs that can provide enhanced or unique visual capabilities or presentations that augment and/or are coordinated with game animation, predetermined game outcomes and/or events occurring during play of a game have been found to be highly popular and effective in both engaging new players and sustaining player interest over time. In particular, it has been recognized that such visual enhancements provide a more engaging game experience have a greater propensity for continuous and/or frequent play. Such visual enhancements in traditional EGMs, however, are somewhat limited on account of limitations with conventional fixed and/or rigid electronic display screens. Specifically, as is generally know, conventional electronic display screens used with traditional EGMs do not have the capability to move or change shape to enhance game animation and thus merely provide a static two-dimensional display presentation.

Although some EGMs have sought to overcome such limitations by attempting to incorporate virtual, computer-generated technologies such as three-dimensional (3D), virtual reality (VR) or augmented reality (AR) animation and effects, such technologies generally require special equipment (e.g. eyewear or headsets) to be fully realized and appreciated. Since procurement of such equipment generally requires a player or EGM operator to incur additional trouble and expense, there is a need for alternative solutions for providing more engaging visual effects. Further, enhanced computer-generated animation is a virtual approach that is often considered less desirable than a real-world enhancement that is able to be experienced and perceived in the physical presence of a player.

DETAILED DESCRIPTION

Figure 1A:
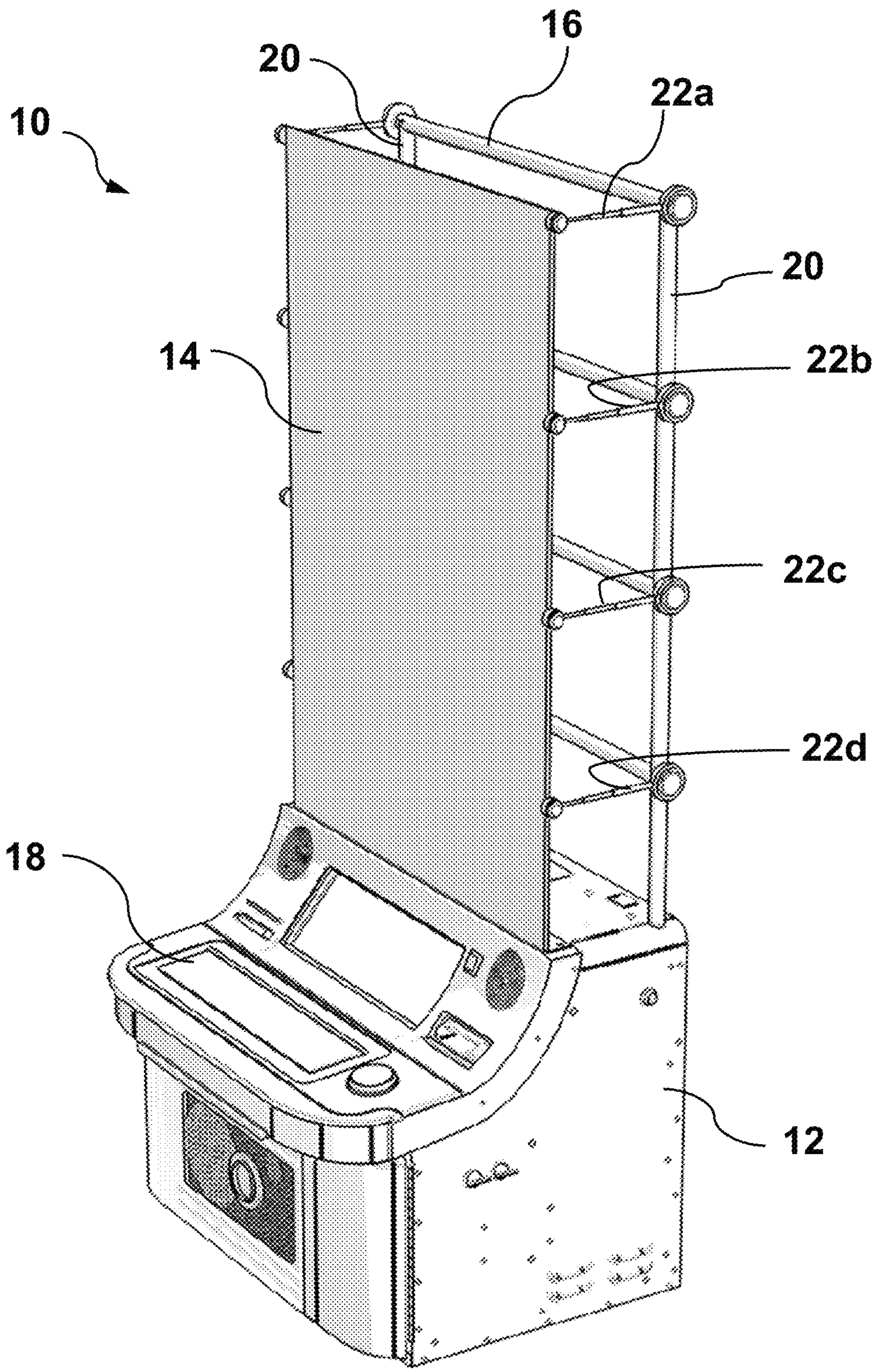
FIGS. 1A through 1E are schematic perspective views of a gaming device according to an exemplary embodiment.

While the subject invention is susceptible of embodiment in many different forms, there are shown in the drawings, and will be described herein in specific detail, embodiments thereof with the understanding that the present disclosure is to be considered as an exemplification of the principles of the invention as well as the best mode of practicing same and is not intended to limit the invention or claims to the specific embodiments illustrated.

Embodiments disclosed herein are generally directed to a gaming device, such as an electronic gaming machine (EGM) that can provide a more dynamic and entertaining gaming experience to a player. In particular, embodiments set forth herein provide a gaming device or EGM having a flexible display screen which can flex, bend and change shape into a plurality of different configurations. Embodiments set forth herein further provide for controlling the adjustment of the shape of the display screen to coincide with events or outcomes of a game played on the device or with animation or other visual content displayed on the screen.

With reference now to the figures, FIGS. 1A through 1E show a gaming device 10 according to an exemplary embodiment. As shown schematically in FIGS. 1A through 1E, gaming device 10 (shown as an EGM) can have a base 12 such as a cabinet or housing, a flexible display screen 14 and a support assembly 16 securing display screen 14 to the cabinet 12. Display screen 14 can be any kind of flexible electronic display panel or device that can visually present electronically generated content or virtual imagery including, for example, a light emitting diode (LED) display, organic light emitting diode (OLED) display, active matrix organic light emitting diode (AMOLED) display, or any kind of display using thin-film transistor (TFT) or electronic paper technology. Display panel 14 can also be configured to have touch-screen capability, such as a touch sensor assembly or interface comprising a substantially transparent touch panel and a touch panel controller and associated software for controlling and interpreting touch data.

As shown schematically in FIGS. 1A through 1E, flexible display panel 14 can bend, twist or be otherwise formed or manipulated into a plurality of different shapes or configurations. Although FIGS. 1A through 1E show flexible display 14 as having a generally elongated rectangular shape, it will be understood that it can have other shapes or sizes without limitation. According to an exemplary embodiment as shown in FIGS. 1A through 1E, cabinet 12 can comprise a user interface or control array 18 configured to enable a player to activate and play a game on the EGM 10. Cabinet 12 can additionally enclose the electronic components of the game, such as a control unit and associated control circuitry.

As shown schematically in FIGS. 1A through 1E, flexible display panel 14 can be secured to cabinet 12 above control array 18 such that the display screen can project visual imagery in front of the device 10 in the direction where a player is usually seated or situated. Alternatively, it will be understood that flexible display panel 14 and support assembly 16 can be separated or detached from cabinet 12 with display panel 14 and mounting assembly 16 being mountable to a separate structure such as a wall, building column, or other apparatus. FIGS. 1A through 1E additionally show display screen secured in a vertical orientation above the cabinet or base 12. It will be recognized and understood, however, that the flexible display 14 can be mounted to the device 10 in different locations, configurations or orientations without limitation.

As shown in FIGS. 1A through 1E, support assembly 16 can extend upward from cabinet 12 along a rear portion of the EGM 10 and behind flexible display panel 14. As shown schematically in FIGS. 1A through 1E, support assembly 16 is shown as being comprised of a frame structure having vertical supports 20 and a plurality of arms 22*a-d* secured along the length of the vertical supports 20, with each arm 22*a-d* extending forward from supports 20 towards the flexible display panel 14. According to the exemplary embodiment shown in FIGS. 1A through 1E, the frame structure can be sized to correspond to the size/shape/dimensions (e.g. height/width) of the flexible display panel 14, with the arms 22*a-d* supporting the display 14 in a substantially upright position or orientation.

Although the frame structure of FIGS. 1A through 1E is shown as having two vertical supports 20, it should be understood that more or less supports can be provided without limitation (see e.g. the exemplary embodiment shown in FIGS. 2A-2D). It will be further recognized that the supports 20 can be a panel or other vertically oriented structure having a different ornamentation from what is shown in FIGS. 1A through 1E. For example, support assembly 16 can be provided as having an intersecting scissors-like configuration which is able to fold or collapse to accommodate bending or flexing of display panel 14 in a vertical or horizontal direction. EGM 10 can further be provided with side covering or shrouding (not shown) such as a flexible material (e.g. fabric or vacuum-form plastic) that can be coupled to the side edges of the flexible display 14 which can conceal the support assembly 16 from view and which can stretch or expand together with the sides of the display panel 14.

As shown in FIGS. 1A through 1E, support arms 22*a-d* can have opposing first and second ends, with the first end being secured to a portion of the support assembly (e.g. one of the vertical supports 20) and the second end being secured to a portion of the flexible display panel 14, such as along the side edge of the display panel 14 or along the rear portion of display panel 14 in a location adjacent the side edge. Although FIGS. 1A through 1E show arms 22*a-d* being secured along the side edges of the flexible display 14 to provide support at the outer side edges of the display, it will be recognized and understood that the arms 22*a-d* can be connected to (and support) the display 14 at other locations, including along the top edge of the display panel 14 and/or interior/central locations along the rear side of the display panel 14 anywhere between the opposing side edges and opposing top and bottom edges. In addition, although the exemplary embodiment shown in FIGS. 1A through 1E show eight arms 22*a-d* (four pairs), it will be understood that EGM 10 can be provided with more or less arms at any location along the height or length of the display panel 14. Arms 22*a-d* can be comprised of any rigid material including, for example, metal, aluminum, stainless steel, or a thermoplastic polymer composite.

According to the exemplary embodiment shown in FIGS. 1A through 1E, arms 22*a-d* can have a telescoping design and can be configured to elongate between an extended position and a retracted position. As shown in FIGS. 1B through 1E, support arms 22*a-d* can further be rotatable and allowed to pivot at the first end relative the support assembly 16. For example, the first end of support arms 22*a*-22*d* can be rotationally secured to supports 20 of assembly 16 and have the capability to pivot or rotate up and down so that the support arm can angle towards the display panel 14. It will be recognized that such rotation of support arms 22*a-d* can facilitate and/or better accommodate vertical movement or displacement of flexible display panel 14 when it bends, bows or twists.

Extension, retraction and rotational movement of support arms 22*a-d* can be controlled by actuators, such as, for example, solenoids or other type of electric, magnetic or thermal actuators, or servo motors/drives which can receive and convert an electrical control signal to induce mechanical movement of the arms 22*a-d* to extend, retract or rotate the respective arm into a predetermined position.

As shown schematically in FIGS. 1A through 1E, movement of arms 22*a-d* into different positions can result in the flexible display bending, twisting, stretching or otherwise changing shape. For example, FIG. 1A shows EGM 10 in a first configuration where all of the arms 22*a-d* extend in a substantially lateral/horizontal direction and have a substantially identical length. According to the embodiment shown in FIG. 1A, such a configuration can result in the side edges of the flexible display 14 being straight and the face being substantially flat along its length.

Figure 1B:
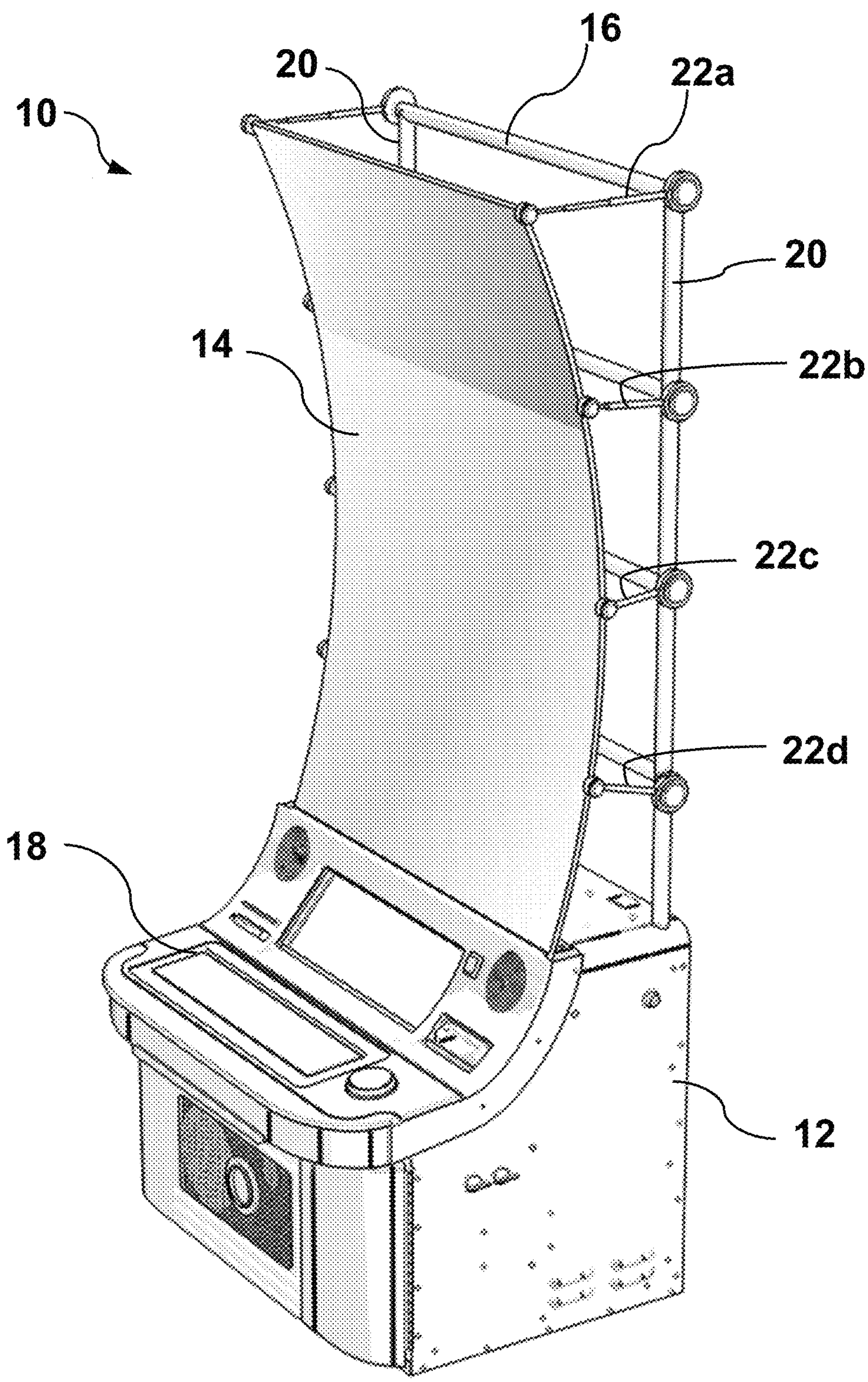
Figure 1C:
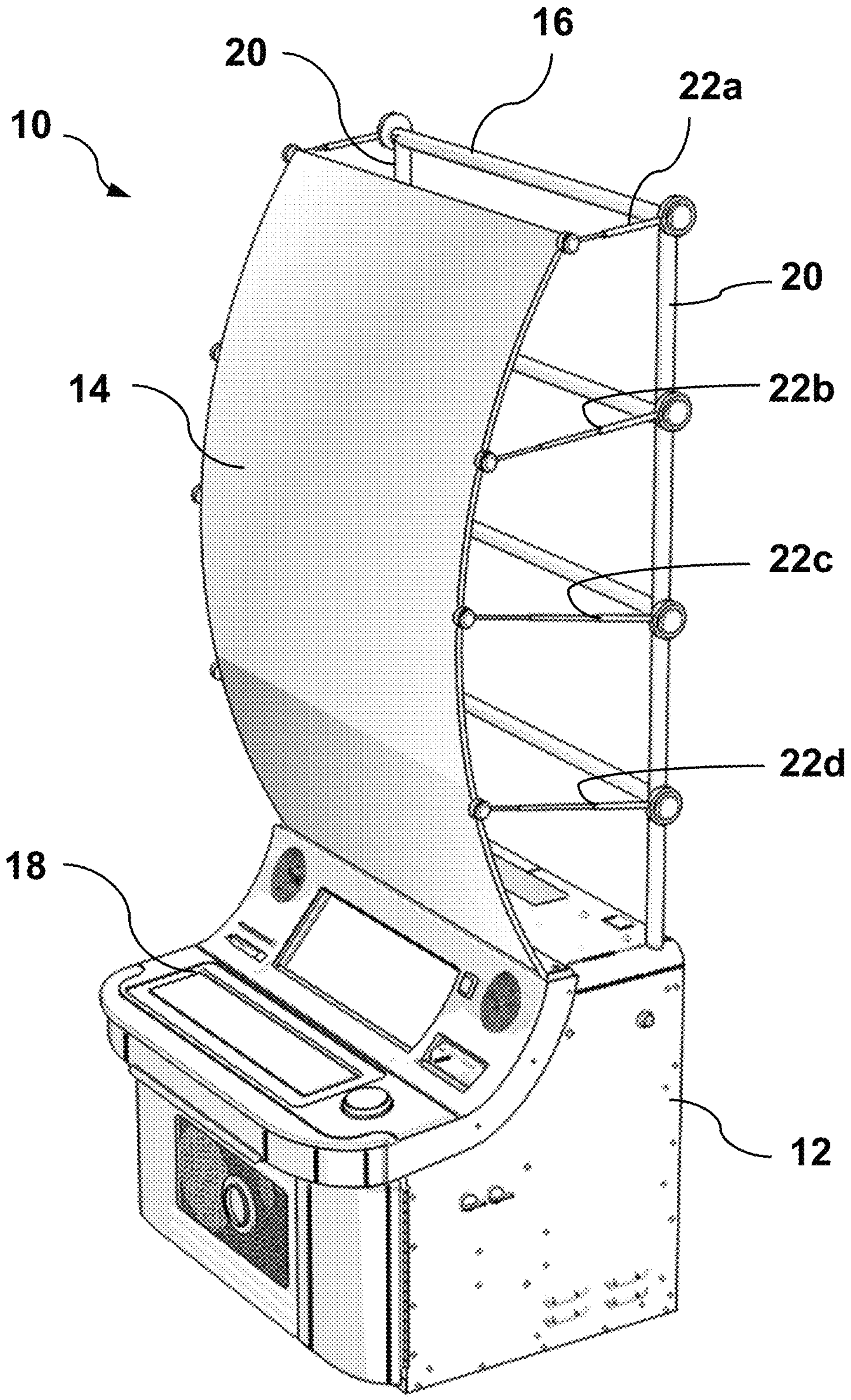

FIG. 1B shows EGM 10 in a second configuration according to an exemplary embodiment where the top pair of arms 22*a* have been extended with the below pairs of arms 22*b-d* being retracted to various degrees from the configuration shown in FIG. 1A. Thus, the top arms 22*a* are extended farther than the arms 22*b-c* along the middle portion of the display panel 14. In addition, support arms 22*b* and 22*d* can be rotated upward from the lateral position shown in FIG. 1A so that support arms 22*b*, 22*d* angle upward as they extend towards the flexible display panel 14.

As shown in FIG. 1B, movement of support arms 22*a-d* in the manner illustrated can result in the middle portion of the flexible display panel 14 being bent inward resulting in the panel taking on a concave shape with the middle portion set back from the top and bottom edges. For example, extending the top pair of arms 22*a* from the position shown in FIG. 1A can push the top edge of the flexible display panel 14 forward/outward and retracting the lower pairs of arms 22*b-d* can pull the lower portions of the flexible display panel 14 inward/rearward closer to the vertical supports 20. Thus, the side edges of the flexible display panel 14 can have an inwardly curved or bowed shape and the face of panel can curve inwardly at the middle portion (away from a player seated at the front of the machine 10). Further, rotation of support arms 22*b* and 22*d* can further accommodate for displacement of the display panel 14 in the vertical direction which may be caused by the panel bending inwardly—it being understood that such bending will cause the panel 14 to be compressed from the vertical orientation shown in FIG. 1A with such compression causing a reduction in the overall height of the display.

FIG. 10 shows EGM 10 in a third configuration according to an exemplary embodiment where the uppermost pair of arms 22*a* have been retracted and the below pairs of arms 22*b-d* have been extended to various degrees from the configuration shown in FIG. 1A. In addition, FIG. 10 shows that support arms 22*c* and 22*d* have been rotated upward from the lateral position shown in FIG. 1A so that support arms 22*c*, 22*d* angle upward as they extend towards the flexible display panel 14.

According to the embodiment shown in FIG. 10, movement of the support arms 22*a-d* into the illustrated positions can bend the flexible display panel 14 into a generally convex shape with the middle portion of the display panel 14 projecting outward/forward beyond the top and bottom edges. For example, retracting the top pair of arms 22*a* from the position shown in FIG. 1A can pull the top edge of the flexible display panel 14 inward/rearward or closer to the vertical supports 20 and extending the lower pairs of arms 22*b-d* can push the lower portions of the flexible display 14 forward. Thus, the side edges of flexible display panel 14 can have an outwardly curved or bowed shape and the face can curve outwardly at the middle portion (towards a player seated at the front of the machine 10) with the top and bottom edges being set farther back. Further, upward rotation of support arms 22*c* and 22*d* can further accommodate for displacement or shifting of the display panel 14 in the vertical direction which may be caused by the panel bending or bowing outwardly—it being understood that such bowing will cause the panel 14 to be compressed from the vertical orientation shown in FIG. 1A with such compression causing a reduction in the overall height of the display.

Figure 1D:
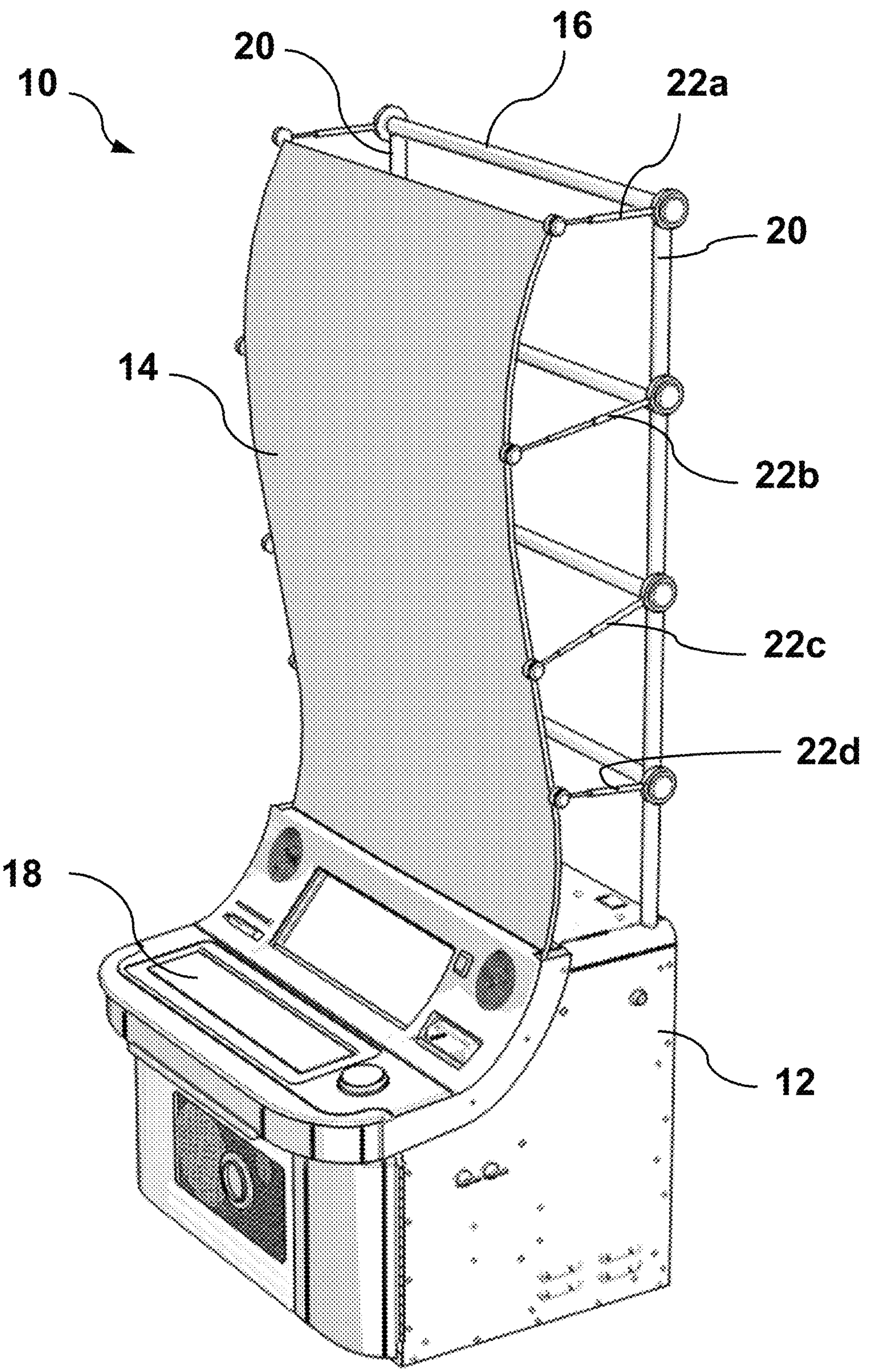

FIG. 1D shows EGM 10 in a fourth configuration according to an exemplary embodiment where the flexible display panel 14 is formed into a generally wave-shape configuration. In particular, the uppermost pair of arms 22*a* are generally shown in the same position as shown in FIG. 10, with the below pairs of arms 22*b-d* being retracted from the positions shown in FIG. 10 so that arms 22*b* extend farther than arms 22*c* and arms 22*c* extend farther than arms 22*d*. In addition, FIG. 1D illustrates support arms 22*b*, 22*c* as having been rotated downward from the lateral/horizontal position shown in FIG. 1A so that support arms 22*b*, 22*c* angle downward as they extend toward the flexible display panel 14. As illustrated in FIG. 1D, positioning support arms 22*a-d* in the manner shown can result in the flexible display panel 14 being formed into a wave-shaped configuration along its length with the portion of display 14 near arms 22*b* curving outward/forward (towards a player seated at the front of the machine 10) and the adjacent portions of display 14 being pulled rearward toward the vertical supports.

Figure 1E:
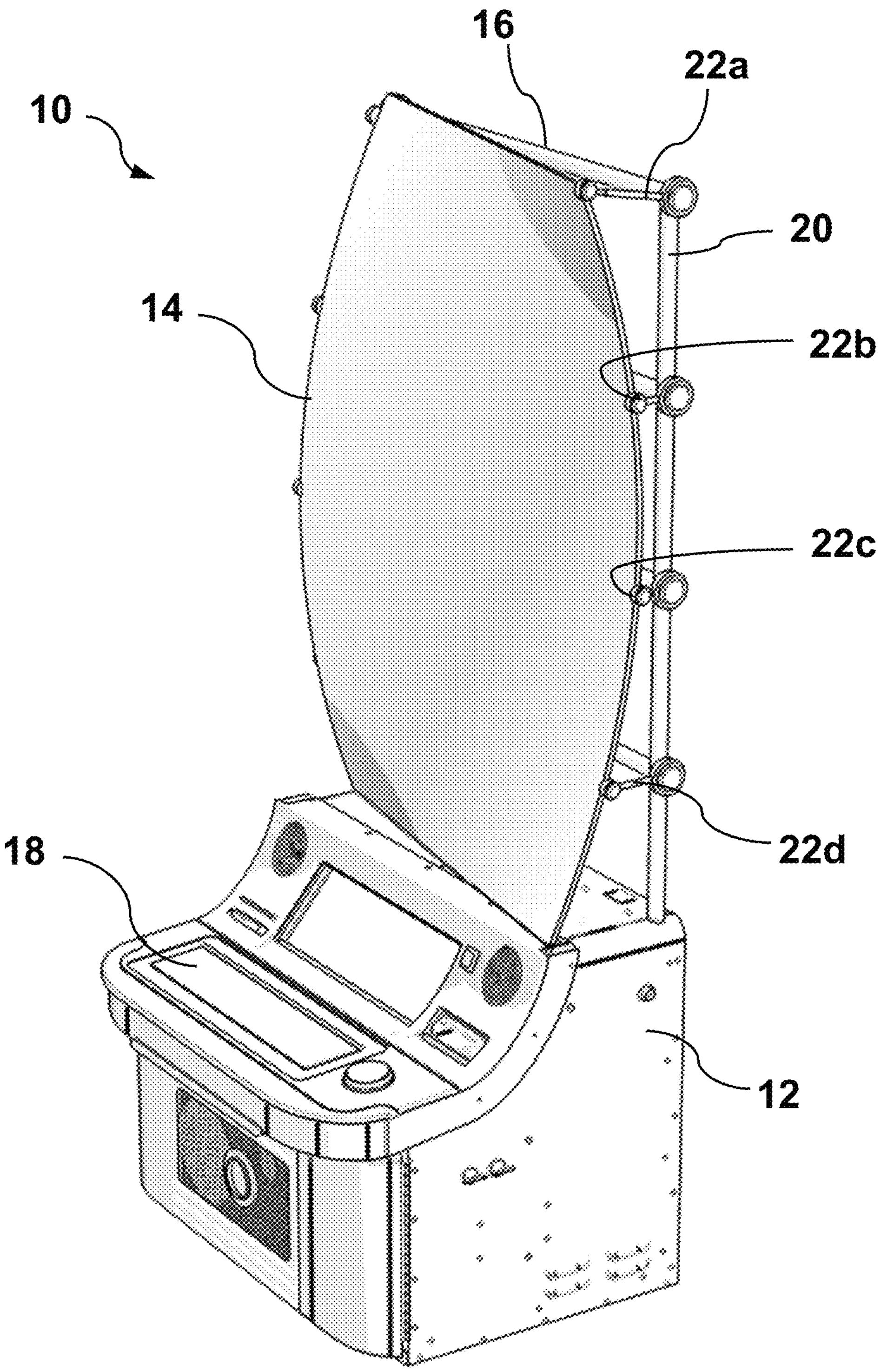

FIG. 1E shows EGM 10 in a fifth configuration according to an exemplary embodiment illustrating an example of the flexible display panel 14 twisted, stretched or formed into a spiral-like or partial helical shape. As shown in FIG. 1E, such configuration can be provided by varying the degree of extension between individual arms of a corresponding pair of arms. For example, as shown in FIG. 1E, the degree of extension of each arm supporting the right side of the flexible display panel 14 is different from the degree of extension of the corresponding arm supporting the left side of the display 14. Specifically, with regard to the top and bottom pairs of arms 22*a*, 22*d*, FIG. 1E shows the arm supporting the right side of the display panel 14 extended farther than the arm supporting the left side of the display panel 14. Thus, at the top and bottom portions of the display, the right side is shown to be more forward than the left side. The opposite is shown with regard to arms 22*b*, 22*c* around the middle portion of the display panel 14. In particular, FIG. 1E shows that with regard to arms 22*b*, 22*c*, the arm supporting the left side of the display panel 14 extend farther than the corresponding arm supporting the right side of the display panel 14. Thus, at the middle portion of the display panel, the left side is shown to be more forward than the right side. FIG. 1E also shows support arms 22*a* being rotated upward from the horizontal position shown in FIG. 1A. Accordingly, the configuration shown in FIG. 1E is a display screen 14 that can be stretched or formed into a spiral-like shape, with the right side edge of the display screen 14 having a generally concave bend (bending rearward at the middle portion), whereas the left side edge of the display screen 14 can have a generally convex bend (bending forward at the middle portion).

FIGS. 1A through 1E illustrate exemplary configurations for EGM 10 and flexible display panel 14 and it will be understood that numerous other shapes or configurations can be implemented without limitation. It will further be recognized that the display panel 14 can take on transitional configurations as it moves from one shape to the other and that movement of the display can be implemented to produce a dynamic or fluid visual effect, such as, for example, an oscillating wave pattern or formation.

Referring to FIGS. 2A through 2D, an EGM 10 according to an additional exemplary embodiment is illustrated. As shown schematically in FIGS. 2A through 2D, EGM 10 can have a support assembly 16 shown as a vertical support member or backbone 20, at least one intermediate support member 21 and an upper support arm 22 having a first end coupled to vertical member 20 by a first rotation point or joint/hinge 23 and a second end having a second rotation point/hinge 25. According to the embodiment shown representationally in FIGS. 2A through 2D, vertical support member 20 can have a telescoping configuration and can extend and retract in a substantially vertical direction 27 to accommodate changes to the height of flexible display panel 14 caused by bowing or flexing of the panel 14.

As shown schematically in FIGS. 2A through 2D, intermediate support members 21 can be coupled and supported along the length of vertical support member 20 and can extend forward to support vertical display panel 14. According to an exemplary embodiment as shown in FIGS. 4A-4D, intermediate support members 21 can have a 'U' shaped design with opposing ends that are securable to rear portions or side edges of flexible display panel 14. Intermediate support members 21 can be comprised of a flexible material to enable such members to bend, flex, extend and/or retract (either passively or actively under actuation and/or automated control). Intermediate members can also be comprised of a helical biasing material, having a spring-like resiliency that can be compressed/stretched. Upper support arm 22 can extend forward from an upper portion of vertical support member 20 from the first rotation joint/hinge 23 to the second rotation joint/hinge 25 which can be an elongated structure configured to secure the top of the flexible display panel 14.

Figure 2A:
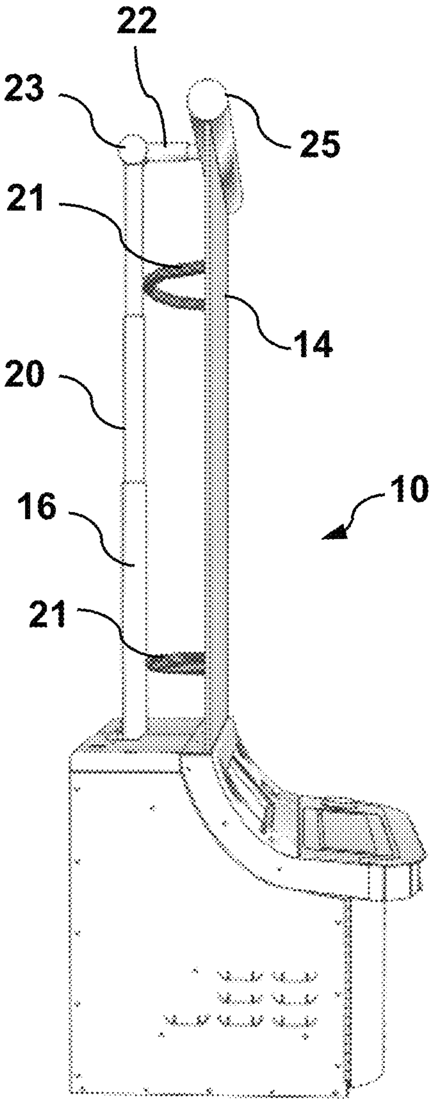
FIGS. 2A through 2D are schematic side elevation views of a gaming device according to an exemplary embodiment.
Figure 2B:
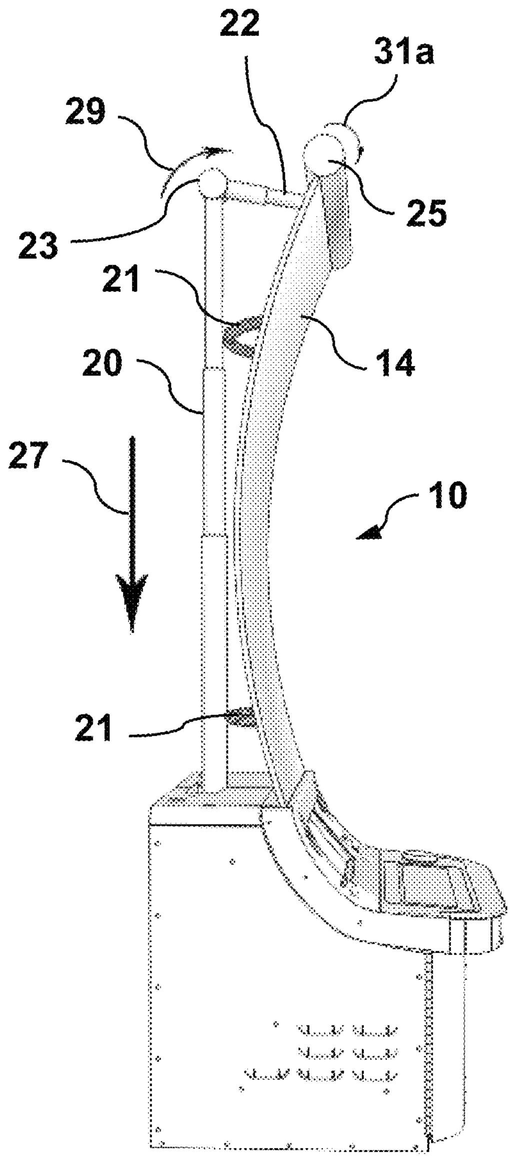
Figure 2C:
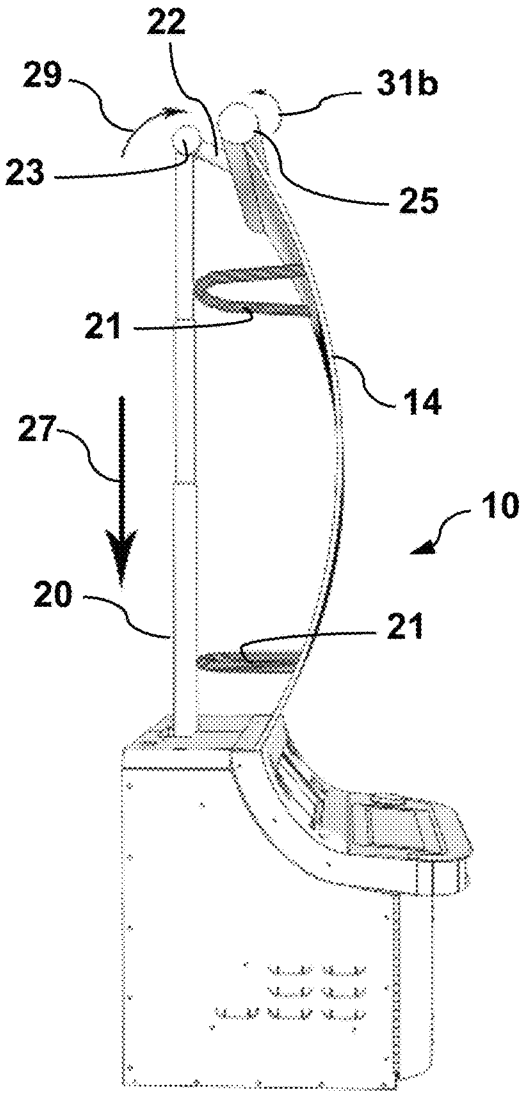
Figure 2D:
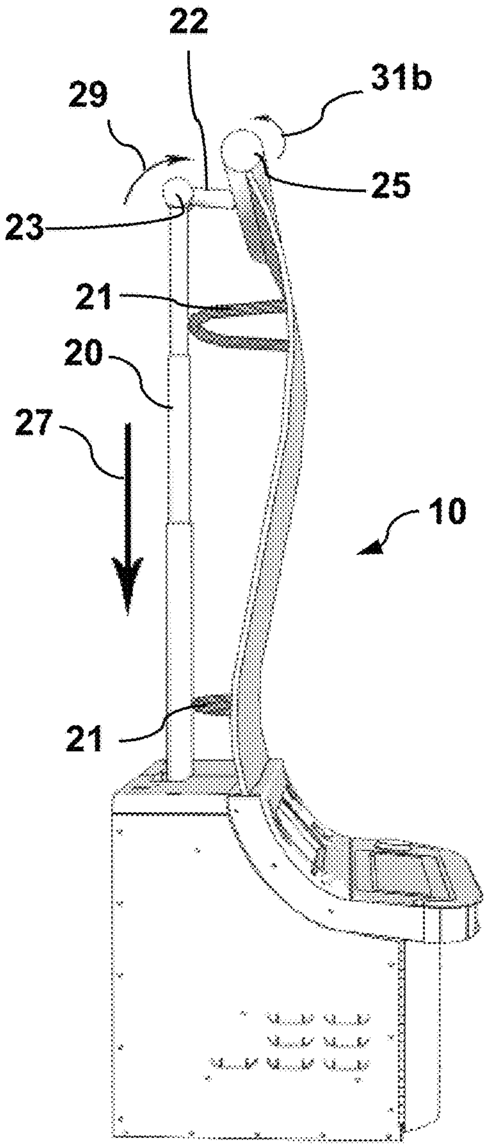

As shown schematically in FIGS. 2B through 2D, first rotation hinge 23 can pivot or rotate in a direction 29 to enable upper support arm 22 to angle downward as it extends forward (although not shown, first rotation point 23 can also accommodate two-way rotation to enable support arm 22 to rotate back upward in a direction opposite to direction 29). According to an exemplary embodiment, second rotation point 25 can be configured to pivot or rotate in directions 31*a*, 31*b* to further facilitate bending or bowing of flexible display panel 14. In addition, vertical support 20 can retract from the extended position as shown in FIG. 2A so that the overall height of support is reduced. For example, as shown schematically in FIG. 2B, flexible display panel 14 is shown as bending inward (in a concave configuration as described above in connection with FIG. 1B). In this configuration, first rotation point 23 can rotate in direction 29 so that upper support arm 22 is angled in a downward direction as it extends toward display 14. Cooperatively, second rotation point 25 supporting the top of display panel 14 can also rotate in direction 31*a* to permit display panel 14 to bend inward along its center portion.

FIG. 2C illustrates EGM 10 in another representative configuration where flexible display screen 14 is bowing outward (a convex orientation as described above in connection with FIG. 1C). In this configuration, first rotation point 23 can rotate in direction 29 from the position shown in FIG. 2A so that upper support arm 22 is angled in a downward direction as it extends forward away from vertical support member 20. Cooperatively, second rotation point 25 coupled to a top portion of display panel 14 can be rotated in direction 31*b* to facilitate the forward/outward bending of the middle portion of display panel 14 as illustrated. Further, the ends or arms of intermediate supports 21 can elongate as illustrated to further push display panel 14 forward.

FIG. 2D illustrates EGM 10 in further representative configuration where flexible display screen 14 is shown in a wave-like configuration (as described above in connection with FIG. 1D). In this configuration, first rotation point 23 can rotate in direction 29 from the position illustrated in FIG. 2A (but not as far as the position in FIGS. 2B and 2C) so that upper support arm 22 is angled in a slightly downward direction as it extends forward away from vertical support member 20. Cooperatively, second rotation point 25 coupled to a top portion of display panel 14 can be rotated in direction 31*b* to facilitate forward/outward bending of the upper portion of display panel 14 as illustrated. Further, the ends or arms of the uppermost intermediate supports 21 can elongate as illustrated to further push the upper portion of display panel 14 forward.

According to exemplary embodiments presented herein, the flexible display panel 14 can flex, bend or change shape in coordination with game play events or imagery/animation displayed on the display panel 14. For example, the actuators inducing movement (extension/retraction/rotation) of the arms 22 can be controlled by game electronics including a control unit and associated control circuitry to correspond to game events taking place in the game. The game, for instance, can include control software and/or other computer readable instructions which can be executed by the control unit, including a programmable processor and control circuitry, to transmit control signals to the respective actuators to control movement of the arms 22. Thus, for example, where the game calls for the display of a portion of a vertically rotatable wheel on the display panel 14, the arms 22 can be controlled to transform the shape of the display screen 14 to the configuration shown in FIG. 10 or 2C which can present the wheel shown on the display as having an outwardly curved shape following the contour of the curved screen 14. It will be recognized that such capabilities can provide a more multi-dimensional and engaging visual reproduction of graphics/imagery shown on the display screen.

According to embodiments presented herein, modification or control of the flexible display 14 can be carried out or prompted automatically by the gaming program in response to the occurrence of a condition or event in the game, by player input, or a combination of both. For example, the game may be programmed so that when the game is idle or in a standby mode, the flexible display panel 14 is in the straight vertical position as shown in FIGS. 1A and 2A. When a player activates the game, such as, for example, by inserting credits, selecting a wager or initiating a spin or play, the display panel 14 can be automatically transformed into a different configuration, such as one of the configurations shown in FIG. 1B-1E or 2B-2D. The game can also present the player with selections for choosing the shape of the flexible display panel 14. Winning outcomes can also generate movement of the flexible display panel 14 and can be coordinated with graphics to enhance the excitement of a winning event.

Embodiments presented herein, can further provide for transition of the flexible display 14 between different configurations within the same game or as part of bonus games or events. The EGM may also be programmed so that specific graphics are associated with predetermined movement or shape of the display panel 14. The game can further provide for movement of the flexible display panel 14 as part of an attract mode when the game is not in use to catch the attention of potential players in the vicinity of the machine 10. According to embodiments presented herein, movement of the flexible display 14 can additionally be synchronized between multiple machines (or displays) to produce a coordinated effect, such as, for example, where a progressive game is being played across multiple machines, or multiple machines are being played as part of a head-to-head game format.

Figure 3:
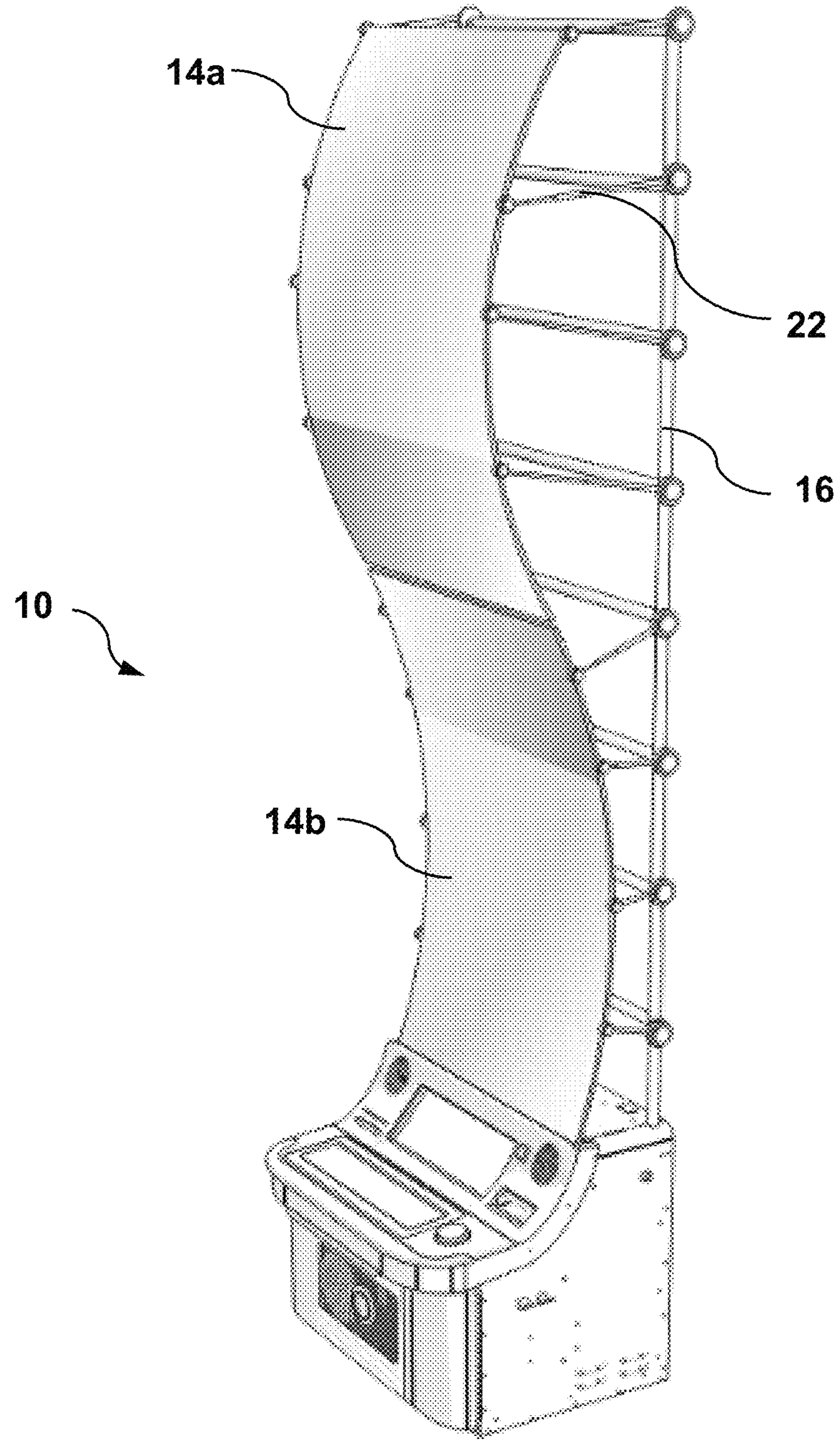
FIG. 3 is a schematic perspective view of a gaming device according to an exemplary embodiment.

FIG. 3 representatively illustrates an exemplary embodiment where EGM 10 is provided with a plurality of display screens 14*a*, 14*b*. As shown schematically in FIG. 3, EGM 10 can have a first display 14*a* secured above a second display 14*b*. Displays 14*a*, 14*b* can be secured to support assembly 16 by way of a plurality of support arms 22 in the manner described above with reference to FIGS. 1A-1E. As shown in FIG. 3, support arms may rotate or pivot to better accommodate stretching or bending of the flexible display panel.

Although FIG. 3 shows displays 14*a*, 14*b* being vertically oriented in a top and bottom arrangement (display 14*a* being above display 14*b*), it will be understood that display panels can have other arrangements/orientations without limitation (e.g. side-by-side arrangement, or one display being in a horizontal (landscape) orientation with the other display in vertical (portrait) orientation). It will further be understood that any number of displays (e.g. more than two) can be provided without limitation.

According to embodiments presented herein, movement of multiple display panels 14*a*, 14*b* of the type illustrated representatively in FIG. 3 can be coordinated to form an expanded dynamic display. Alternatively, one of the displays can be integrated or tied into the game control unit and be controlled to coordinate with game events, with the other display being unconnected or electronically isolated from the game control unit for use with signage, messaging, promotion or other informational/marketing purposes. Where a display panel is unconnected to the game control unit, presentation of graphics on such display panel (and movement of such display panel) can be controlled through computer-readable instructions stored on a transitory or non-transitory computer readable medium that is not incorporated into the cabinet or EGM and thus may not be subject to the same level of gaming regulations that are applicable to gaming machines in certain jurisdictions. Where such unconnected display panel is used, presentation of graphics and animation (and movement) can be programmed to relate to the theme of the game played on the EGM and or graphics presented on the other integrated display panel.

Figure 4:
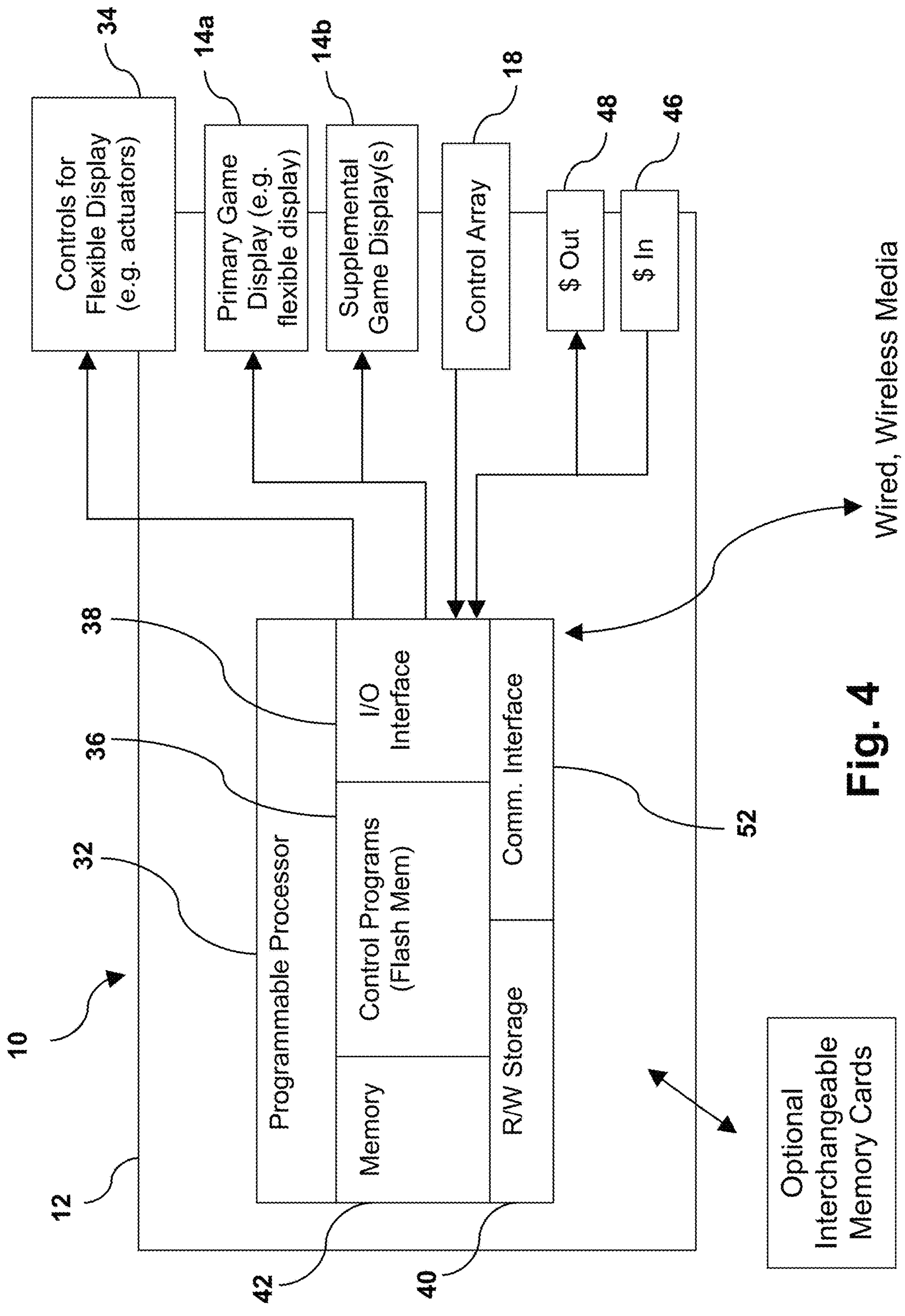
FIG. 4 is a schematic block diagram of a representative architecture for an electronic gaming device according to an exemplary embodiment.

FIG. 4 is a block diagram illustrating an exemplary architecture for an electronic gaming machine ("EGM") 10 according to embodiments of the subject invention. As shown schematically in FIG. 4, The EGM 10 can include a control unit including, for example, programmable processor 32 (such as for example a microprocessor or microcontroller) operatively coupled to one or more game displays 14*a*, 14*b*. The control unit 32 can include associated control circuitry and be operatively connected to an interface 38 with input/output circuits and at least one storage unit 40 which can store a plurality of computer readable instructions executable by control unit 32. The EGM 10 can also include memory 42 which can include a main memory containing dynamic information processed by processor 32 and/or a static memory which can contain fixed information, such as, for example, an operating system, game programs, and a configuration of information necessary for control unit 32 to register and execute input from a player through control array 18. Such components can be housed and/or secured within cabinet 12.

The control unit 32 can execute control programs 36 to control movement of the flexible display panel 14 as described above and to carry out primary functions for play of the game. For example, control unit 32, control programs 36 and associated circuitry can process game input, operations and events and instruct signals to be transmitted to the controls or actuators 34 to move, adjust or extend into predetermined positions associated with corresponding shapes of the flexible display 14*a*.

Additional primary functions carried out by control unit 32 can include, for example, processing input commands and signals associated with the deposit of credits, randomly selecting game outcomes from a plurality of possible outcomes, recognizing a particular outcome as a predetermined winning or non-winning outcome and/or determining a reward amount associated with a particular winning outcome. The control unit 32 can additionally control the game displays 14*a*, 14*b* by generating static or dynamic video for presentation thereon.

The player control array 18 can include one or more input devices, such as for example, a keyboard, mechanical lever, a touch-screen, push buttons or pads and/or any other means for control, or desired combination of controls, able to accept input from a player and produce output to the game display 14*a*, 14*b* in response to a player's input. Displays 14*a*, 14*b* can include the flexible display screen as described above in more detail and any supplemental or additional conventional electronic display device suitable for electronically presenting graphics or images associated with a game played on the EGM 10, or other information such as advertising/promotional content.

Where embodiments of the subject invention are practiced or provided in connection with a wagering game, the gaming device 10 can further include a credit input device 46, such as for example a coin or bill acceptor or card reader and a payout device 48. The credit input device 46 and payout device 48 can be operatively connected to the control unit 32 and when money or other credits are deposited in connection with a game, the control program 36 can instruct the payout device 48 to issue an award in response to the selection of certain predetermined winning outcomes of the game. The reward or payoff can be provided in any form, including for example, coins, bills, credits, points, cards, tickets or coupons.

The gaming device 10 can additionally feature communication means for electrically transmitting signals, including control signals, game data or detected conditions to a remote electronic device such as for example, a computer, network or display device, dedicated storage device, or other mobile electronic device such as a PDA, smart phone, notebook computer or electronic tablet. Such communication means can include a communication interface 52 that can connect the EGM 10 to external electronic devices via wired or wireless communication.

FIGS. 5 and 6 schematically illustrate an exemplary electronic gaming machine (EGM) 100 according to additional embodiments presented herein. As shown schematically in FIGS. 5 and 6, EGM 100 can have a plurality of electronic display screens 110, 112, 114, a control deck 116 and a base or cabinet portion 118. Electronic display screens 110 and 112 can be flat panel electronic displays such as LCD, LED or OLED, QLED or QD-OLED display screens. According to exemplary embodiments, electronic display 114 can be utilized as a user control interface/panel and can be provided with touch sensing capability provided by a touch sensor/panel, touch controller and associated software which can detect and process touch input data. The touch sensor/panel can be resistive or capacitive. Electronic control panel display 114 can be any kind of flexible electronic display panel or device that can visually present electronically generated content or virtual imagery including, for example, a light emitting diode (LED) display, organic light emitting diode (OLED) display, quantum dot LED or OLED display, active matrix organic light emitting diode (AMOLED) display, or any kind of display using thin-film transistor (TFT) or electronic paper technology. According to exemplary embodiments, flexible control panel display 114 can visually present electronic representations of selectable indicia such as virtual control buttons or other selections for play of the game. Such display, in association with the touch sensing capability, can enable a user to make selections and/or provide input for control or play of the game.

According to exemplary embodiments shown schematically in FIGS. 5 and 6, flexible control panel display 114 can be provided on incorporated into control deck 116 which can include other control buttons, actuators or other input/output devices including, for example, a credit input device such as a coin or bill acceptor or card reader, a payout receptacle and/or audio transducers. As shown schematically in FIGS. 5-6, control deck 116 can project forward from a front area of the cabinet portion 118 and electronic control panel display 114 can be positioned along a top surface thereof and in a location below electronic displays 110, 112. It will be understood, however, that alternate configurations/orientations for electronic displays 110, 112, 114 can be provided without limitation.

Figure 5A:
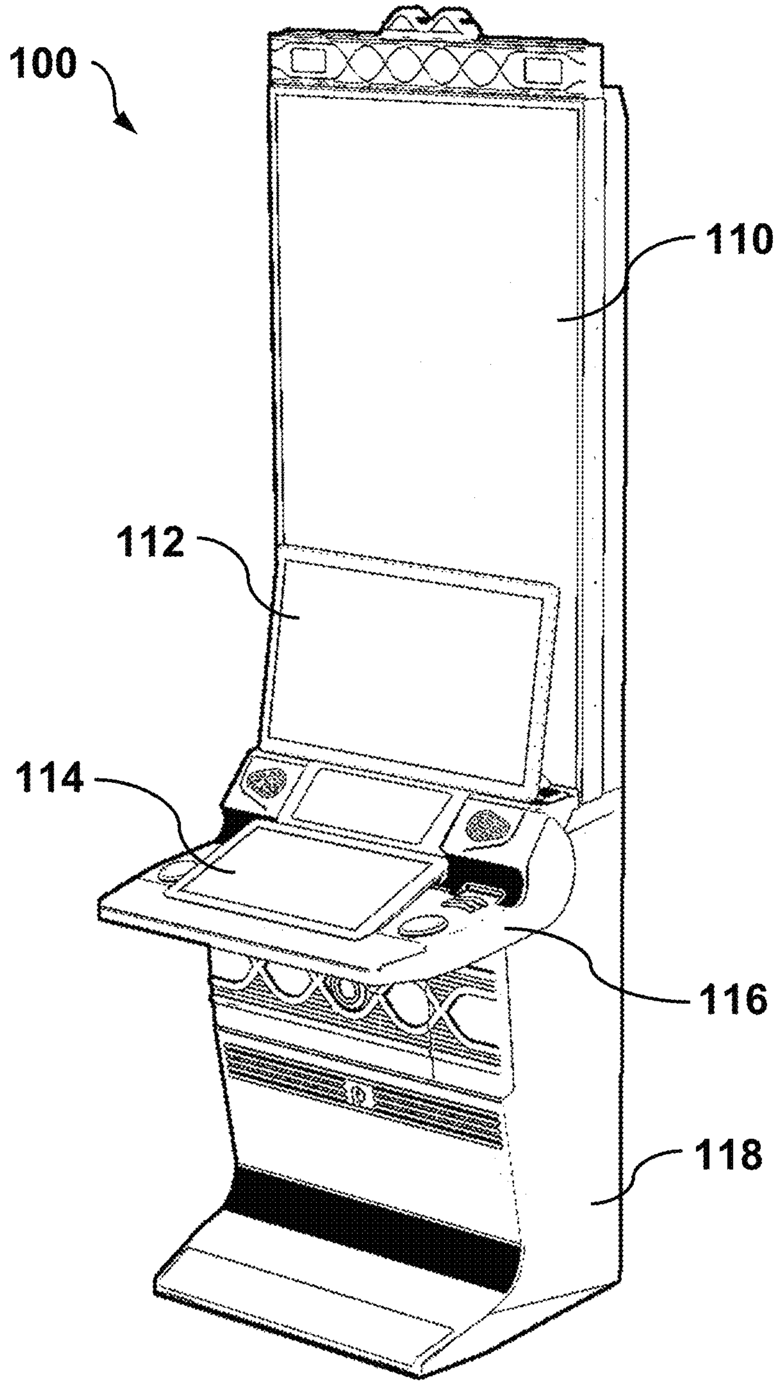
FIG. 5A is a schematic perspective view of a gaming device according to an exemplary embodiment.
Figure 5B:
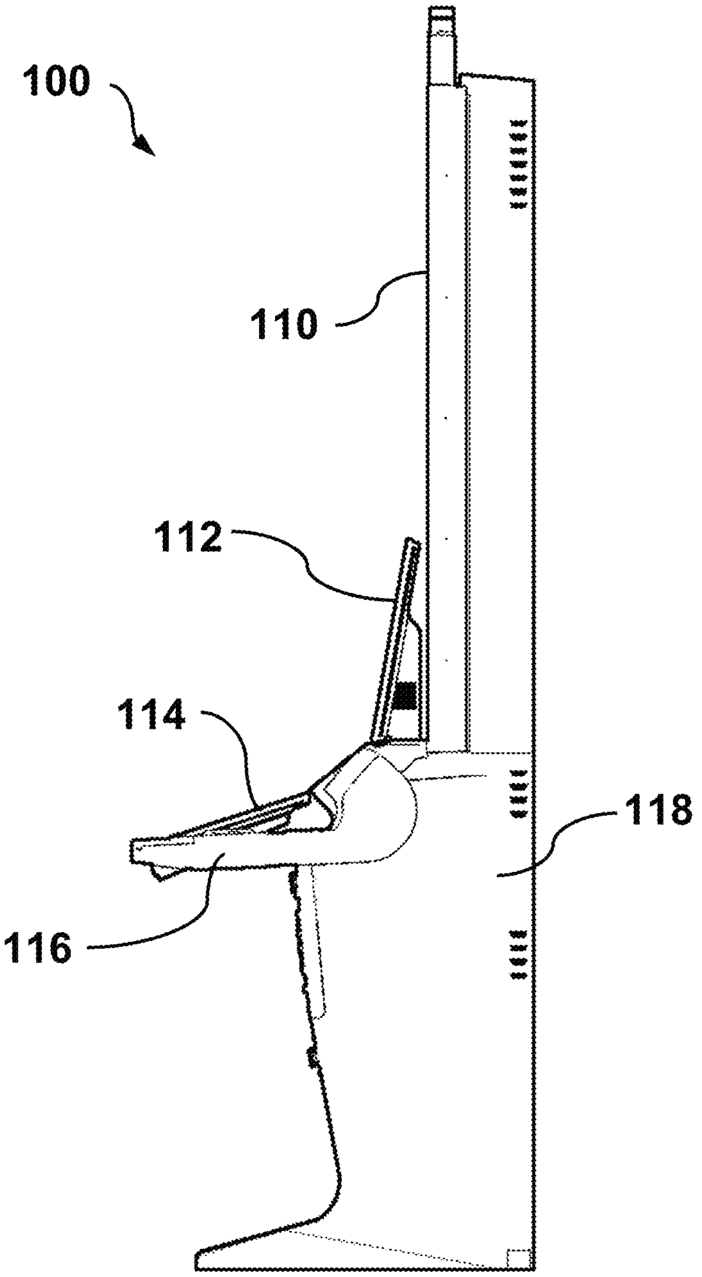
FIG. 5B is a schematic left side elevation view of a gaming device according to an exemplary embodiment.
Figure 6A:
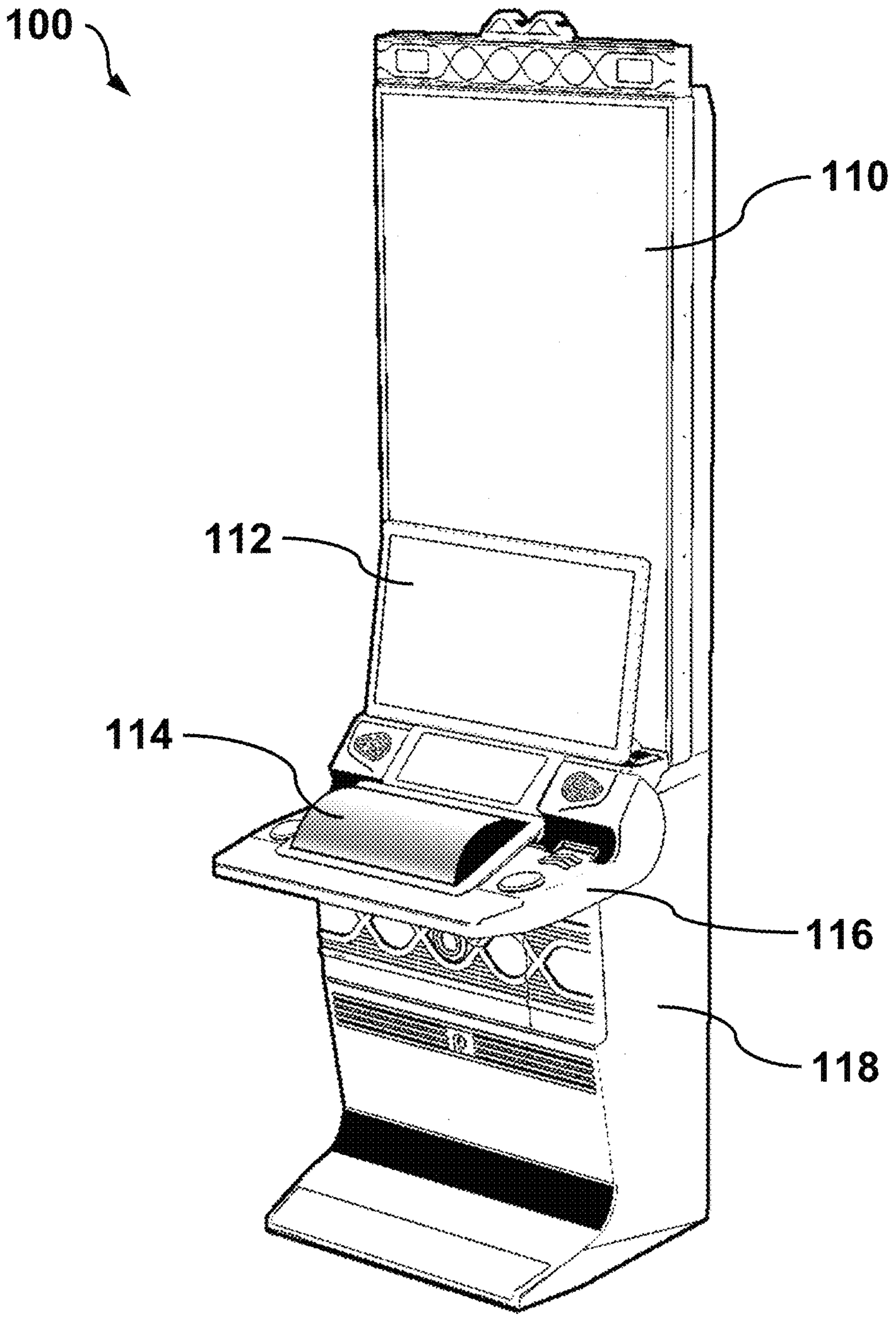
FIG. 6A is a schematic perspective view of a gaming device according to an exemplary embodiment.
Figure 6B:
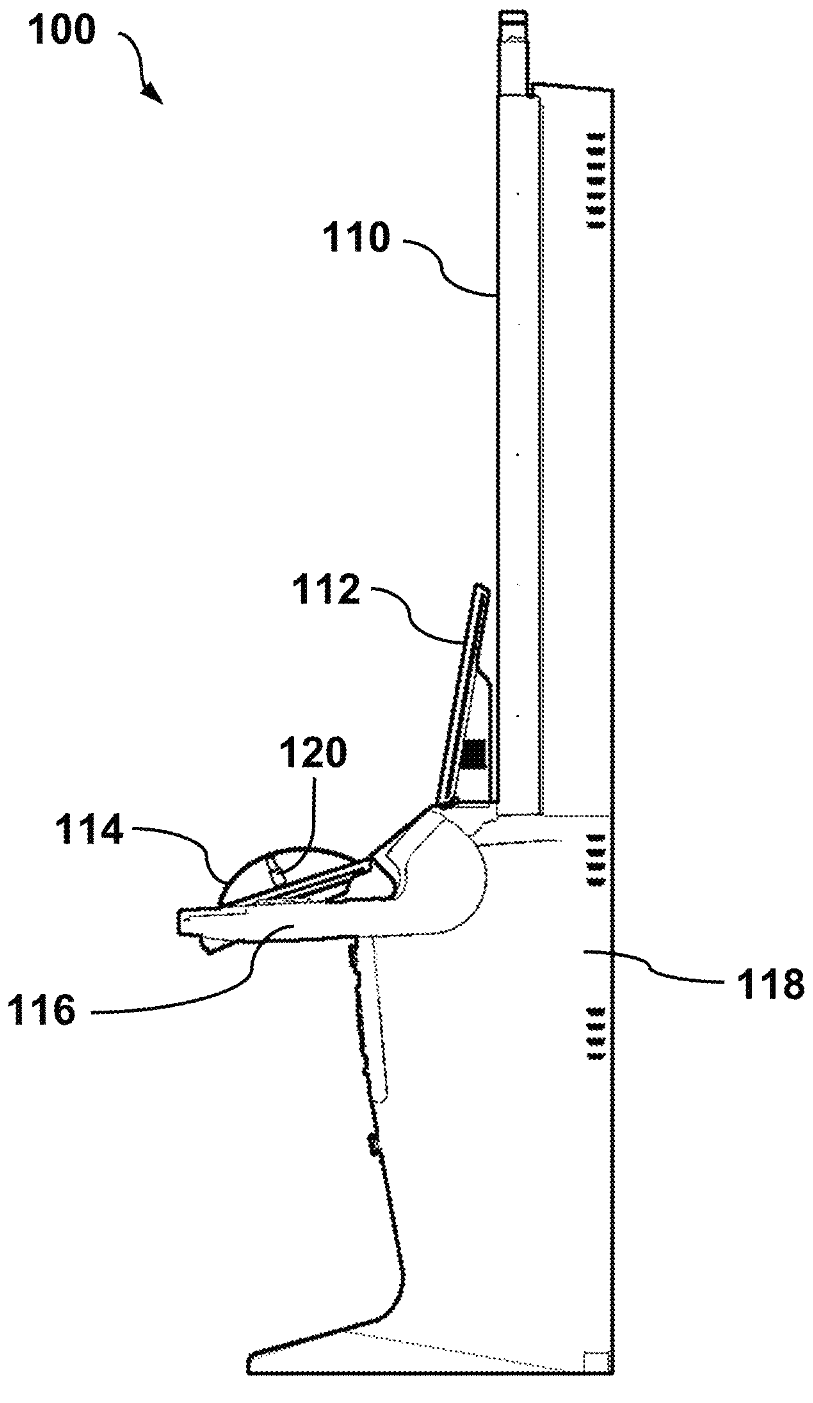
FIG. 6B is a schematic left side elevation view of a gaming device according to an exemplary embodiment.

FIGS. 5A and 5B show flexible control panel display 114 in a uncurved condition. In such condition, control panel display 114, can be substantially flat and can be positioned at an angle relative a horizontal axis to better facilitate presentation of data to a player. FIGS. 6A and 6B show flexible control panel display 114 in a bent or curved condition whereby the middle portion of the display panel is bowed outward along the horizontal length of the display outward from the opposing top and bottom edges. According to exemplary embodiments shown schematically in FIG. 6B, the EGM 110 can comprise a mechanical actuator or extender 120 located behind or underneath the underside of flexible control panel display 114. According to exemplary embodiments, extender 120 can have a telescoping configuration having a plurality of stages of progressively smaller diameters or cross-sections which are nested within one another. The extender 120 be operatively coupled to a motor or drive assembly which can cause the telescoping sections to slide out from one another to lengthen extender 120. Extender 120 can engage with the underside of the flexible control panel display 114 can exert force to push corresponding portions of the display panel outward. Retraction of the extender 120 can cause the flexible control panel display 114 to flatten by either pulling back on the underside of the panel or disengaging from the panel, the panel having certain elasticity to return toward the flat uncurved condition.

It will be recognized and appreciated that other mechanisms and arrangements can be utilized to manipulate the flexible control panel display 114 between a flat and curved condition without limitation. As one example, the opposing side and top and bottom edges of the flexible control panel display 114 can be fitted into or against a frame that has movable edges. Accordingly, moving the top and bottom edges (or opposing side edges) of the frame closer together can cause the body of the flexible panel display to bulge or protrude outward. Additionally, changing the shape of the frame, such as for example, by rotating or bending portions of the side edges of the frame can cause certain corresponding segments of the flexible control panel to stretch or flex to take on a corresponding shape/orientation.

According to exemplary embodiments shown schematically in FIGS. 5 and 6, the flexible control panel display 114 can flex, bend or change shape in coordination with game play events, user input or imagery/animation displayed on any of the display screens 110, 112, 114. For example, the extender 120 or other mechanisms which cause the flexible display 114 to bend can be controlled by game electronics including a programmable controller and associated control circuitry to in response to certain programmed conditions. The game, for instance, can include control software and/or other computer readable instructions which can be executed by the control unit, including a programmable processor and control circuitry, to transmit control signals to the drive assembly or actuator to induce movement of the extender or other mechanical mechanisms. Thus, for example, where the game program registers a predetermined condition or input associated with the bending of the flexible control panel display, the extender 120 can be actuated accordingly. It will be recognized that such capabilities can provide a more multi-dimensional and engaging visual reproduction of graphics/imagery shown on the display screen.

According to embodiments presented herein, modification or control of the flexible control panel display 114 can be carried out or prompted automatically by the gaming program in response to the occurrence of a condition or event in the game, by player input, or a combination of both. For example, the game may be programmed so that when the game is idle or in a standby mode, the flexible control panel display 114 can be in a substantially flat or uncurved condition as shown in FIGS. 5A and 5A. When a player activates the game, such as, for example, by inserting credits, selecting a wager or initiating a spin or play, the flexible control panel display 114 can be manipulated into a curved condition representatively illustrated in FIGS. 6A and 6B. The game can also present a player with selections for choosing the shape of the flexible control panel display 114. Winning outcomes can also generate movement of the flexible control panel display 114 and can be coordinated with graphics to enhance the excitement of a winning event.

Embodiments shown in FIGS. 5 and 6 can further provide for transition of the flexible control panel display 114 between different configurations within the same game or as part of bonus games or events. The EGM may also be programmed so that specific graphics are associated with predetermined movement or shape of the flexible control panel display 114. The game can further provide for movement of the flexible control panel display 114 as part of an attract mode when the game is not in use to catch the attention of potential players in the vicinity of the EGM 110. According to embodiments presented herein, movement of the flexible control panel display 114 can additionally be synchronized between multiple machines (or displays) to produce a coordinated effect, such as, for example, where a progressive game is being played across multiple machines, or multiple machines are being played as part of a head-to-head game format.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

Further, logic flows depicted in the figures do not require the particular order shown, or sequential order, to achieve desirable results. Other steps may be provided, or steps may be eliminated, from the described flows, and other components may be add to, or removed from the described embodiments.

What is claimed is:

1. An electronic gaming device comprising:

a control unit;

a plurality of electronic display devices secured to a cabinet, the plurality of electronic display devices comprising a first display device, a second display device and a flexible control panel display coupled to the control unit, the first display device being located behind the second display device with the second display device concealing at least a part of the first display device, the flexible control panel display having opposing first and second edges and a central region therebetween and being configured to display selectable indicia and receive and register touch input, the flexible control panel display being outside the cabinet and secured along a top surface of a control deck projecting laterally forward from a front of the cabinet;

a mechanical device coupled to the control unit and configured to engage at least a portion of the flexible control panel display; and wherein upon engagement by the mechanical device, the flexible control panel being manipulated from a flat condition to a curved condition, wherein the first and second edges and the central region are each in alignment in the flat condition along an axis and wherein said manipulation comprises movement of the central region outward from the axis with the first and second edges remaining fixed along the axis, in the curved condition the flexible control panel taking on an arcuate configuration extending from the first edge to the second edge.

2. The electronic gaming device of claim 1 wherein the mechanical device is a telescoping extender comprised of a plurality of stages of varying sizes, the telescoping extender being adjustable between a retracted condition whereby the plurality of stages are nested and an extended condition, wherein a force is applied to an underside of the flexible control panel by the telescoping extender when the telescoping extender is in the extended condition.

3. The electronic gaming device of claim 1 wherein the flexible control panel display is selected from a group comprising a light emitting diode (LED) display, organic light emitting diode (OLED) display, a quantum dot LED display, active matrix organic light emitting diode (AMOLED) display and an electronic display utilizing thin-film transistor (TFT).

4. The electronic gaming device of claim 1 wherein the control unit comprises control circuitry; a control signal being generated by the control circuitry in response to the registration of at least one of a predetermined condition and touch input received by the flexible control panel display, the control signal actuating the mechanical device to engage the flexible control panel display.

5. The electronic gaming device of claim 4 wherein the predetermined condition is selected from a group comprising: an occurrence of a game event in a game played on the electronic gaming device; a display of a representation on one of the plurality of electronic display devices; the electronic gaming device initiating an attract mode; the electronic gaming device initiating a standby mode; registration of a wager by the electronic gaming device; initiation of a new game on the electronic gaming device; registration of a winning outcome of a game played on the electronic gaming device; and initiation of a bonus game on the electronic gaming device.

6. The electronic gaming device of claim 1 wherein the mechanical device is configured to engage a rear surface of the flexible control panel display along the central region.

7. A method comprising:

providing an electronic gaming device comprising a control unit, a plurality of electronic display devices, and a mechanical device, the plurality of electronic display devices comprising a first display device, a second display device and a flexible control panel display having opposing first and second edges and a central region therebetween and having touch sensing capability, the first display device being located behind the second display device with the second display device concealing at least a part of the first display device, the flexible control panel display being outside the cabinet and secured along a top surface of a control deck projecting laterally forward from a front of the cabinet;

displaying selectable indicia on the flexible control panel display;

receiving and registering touch input on the flexible control panel display;

registering a predetermined condition and generating an electrical control signal in response thereto;

actuating the mechanical device to engage the flexible control panel display in response to the control signal, and manipulating the flexible control panel from a flat condition to a curved condition, wherein the first and second edges and the central region are each in alignment in the flat condition along an axis and wherein said manipulation comprises movement of the central region outward from the axis with the first and second edges remaining fixed along the axis, in the curved condition the flexible control panel taking on an arcuate configuration extending from the first edge to the second edge.

8. The method of claim 7 wherein the mechanical device engages an underside of the flexible control panel.

9. The method of claim 7 wherein the predetermined condition is selected from a group comprising: an occurrence of an game event in a game played on the electronic gaming device; a display of a representation on one of the plurality of electronic display devices; the electronic gaming device initiating an attract mode; the electronic gaming device initiating a standby mode; registration of a wager by the electronic gaming device; initiation of a new game on the electronic gaming device; registration of a winning outcome of a game played on the electronic gaming device; and initiation of a bonus game on the electronic gaming device.

* * * * *